US009594922B1

(12) United States Patent
McGuire et al.

(10) Patent No.: US 9,594,922 B1
(45) Date of Patent: Mar. 14, 2017

(54) NON-PERSISTENT SHARED AUTHENTICATION TOKENS IN A CLUSTER OF NODES

(71) Applicant: EMC Corporation, Hopkinton, MA (US)

(72) Inventors: Cynthia McGuire, Gilroy, CA (US); Alex Pecoraro, Huntersville, NC (US); Steve Hubbell, Seattle, WA (US); Krister Johansen, Hayward, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 64 days.

(21) Appl. No.: 14/788,755

(22) Filed: Jun. 30, 2015

(51) Int. Cl.
*H04L 29/06* (2006.01)
*G06F 21/62* (2013.01)
(Continued)

(52) U.S. Cl.
CPC ............ *G06F 21/6218* (2013.01); *H04L 9/08* (2013.01); *H04L 9/3234* (2013.01)

(58) Field of Classification Search
CPC ...... G06F 21/6218; H04L 9/08; H04L 9/3234
(Continued)

(56) References Cited

U.S. PATENT DOCUMENTS 6,122,631 A * 9/2000 Berbec ................. G06F 9/52
7,248,693 B1 * 7/2007 Tretter ................. H04L 9/3234
380/278

(Continued)

OTHER PUBLICATIONS

"Benchmarking OpenStack Keystone token formats", Dolph Matthews, Jun. 2015, http://dolphm.com/benchmarking-openstack-keystone-token-formats/.
(Continued)

*Primary Examiner* — Michael S McNally
(74) *Attorney, Agent, or Firm* — Krishnendu Gupta; Sean M. Evans

(57) ABSTRACT

Implementations are provided herein for a token to be generated on one node within the cluster of nodes, and then used on any of the nodes to authenticate future client requests that include the token. The basis of the token can be a set of name value pairs that include discriminative information related to the client's user name, access zones, token timestamp, etc. An additional name-value pair or set of pairs can included encryption salt for additional security. The set of name value pairs can then be encrypted, in one implementation, using Advanced Encryption Standard ("AES") 256 bit key. Each node among the cluster of nodes can have access to the current encryption key. Thus, a single key, or in some implementations, past keys that are still valid, can be used to decrypt received tokens by any node among the cluster of nodes. Once decrypted, the name-value pairs of the decrypted token can be validated. The serialized name-value pairs in the token permit the system to quickly identify and authorize access to the cluster to the token holder. Thus, it can be appreciated that a persistent store of all previously authenticated tokens does not need to be maintained. It can also be appreciated that the process of decrypting and validating the token against can decrease computational costs associated with extensive table lookups.

21 Claims, 4 Drawing Sheets

(51) Int. Cl.
*H04L 9/08* (2006.01)
*H04L 9/32* (2006.01)

(58) Field of Classification Search
USPC .......................................................... 713/165
See application file for complete search history.

(56) References Cited

U.S. PATENT DOCUMENTS

| | | | |
|---|---|---|---|
| 2006/0184997 A1* | 8/2006 | La Rotonda | G06Q 10/10 726/2 |
| 2007/0033637 A1* | 2/2007 | Yami | H04L 63/0428 726/2 |
| 2007/0113078 A1* | 5/2007 | Witt | G06F 21/602 713/165 |
| 2008/0046715 A1* | 2/2008 | Balazs | G06F 21/41 713/152 |
| 2009/0112769 A1* | 4/2009 | Dicks | G06Q 50/22 705/51 |
| 2010/0011431 A1* | 1/2010 | Cynkin | G06F 21/6218 726/9 |
| 2016/0218866 A1* | 7/2016 | Patil | H04L 9/0833 |

OTHER PUBLICATIONS

"Keystone Lightweight Tokens", Lance Bragstad, Feb. 24, 2015, https://blueprints.launchpad.net/keystone/+spec/klw-tokens.

\* cited by examiner

NON-PERSISTENT SHARED AUTHENTICATION TOKENS IN A CLUSTER OF NODES

FIELD OF THE INVENTION

This invention relates generally to distributed file systems, and more particularly to systems and methods for establishing and using a shared non-persistent authentication token to authorize clients to make transactions within a cluster of nodes.

BACKGROUND OF THE INVENTION

Distributed file systems offer many compelling advantages in establishing high performance computing environments. One example is the ability to easily expand, even at large scale. Another example is the ability to support multiple unique network protocols. In one example, a distributed file system can operate under a cluster of nodes topology, whereby clients can connect to any node among the cluster of nodes to perform file system activity.

When accessing the file system, and connecting to individual nodes among a cluster of nodes, the distributed file system may seek to move or redirect clients from one node to another. For example, to achieve load balancing, a client on an overburdened node may be moved to a node that has spare capacity. It can be appreciated that by efficiently moving clients between nodes among a cluster of nodes, aggregate client performance can be increased. In another example, a node can suffer node failure, whereby the node is no longer responsive to client requests. In this example, a client may be redirected to a different node that is still functioning and capable of fulfilling client requests.

When connecting to a node, clients first must be authenticated to determine if they have the appropriate privileges to access the file system. If the client is authenticated, the distributed file system can provide a token that is a unique string of characters. The token can then be included in the header parameter of subsequent requests from the client. The token persists with the client and allows the client to perform file system requests without resubmitting authentication information such as a user name, password, account, etc. for each subsequent client request.

One means for validating the token across all nodes of a cluster of nodes would be to store each authenticated token as a file or as a part of a file within the distributed file system. The file would be accessible to all nodes within the cluster of nodes, and each time a token is received as a part of a client request, the shared file can be used to determine whether the token is valid. However, it can be appreciated that the overhead associated with maintaining a shared file of valid tokens, and consulting the shared file to match a received token with potentially hundreds or thousands of valid tokens within the shared file make such a solution taxing of resources when used in large scale implementations. Therefore, there exists a need for an efficient solution at scale to validate previously authenticated users of a distributed file system across all nodes of a cluster of nodes.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

In accordance with an aspect, a current encryption key and a set of active past encryption keys can be maintained within a cluster of nodes operating as a distributed file system wherein the current encryption key and active past encryption keys in the set of active past encryption keys are associated with an expiration timestamp and are accessible by any node among the cluster of nodes and wherein active past encryption keys in the set of active past encryption keys have not reached the expiration timestamp associated with each respective active past encryption key in the set of active past encryption keys. A token can be received by a node among the cluster of nodes wherein the token is associated with a request for the distributed file system. It can be determined if the token can be decrypted with the current encryption key. In response to determining the token can be decrypted with the current encryption key, a decrypted token can be generated and it can be determined if the decrypted token is valid based on a list of name value pairs within the decrypted token. In response to determining the decrypted token is invalid, a message can be sent to a client associated with the request that the token is invalid. In response to determining the decrypted token is valid, the node can be authorized to perform the request In another aspect, in response determining the token cannot be decrypted with the current encryption key, the token can be iteratively decrypted using active past encryption keys in the set of active past encryption keys. In response to determining one of the active past encryption keys in the set of active past encryption keys can decrypt the token, a decrypted token can be generated and it can be determined if the decrypted token is valid based on the list of name value pairs within the decrypted token. In response to determining the iterative decryptions are invalid, a message can be sent to the client associated with the request that the token is invalid.

In another aspect, a command can be received to replace the current encryption key based on at least one of the expiration timestamp or an administrator request. A new encryption key can be generated based on at least one of the expiration timestamp or an administrator request wherein the new encryption key replaces the current encryption key and wherein the current encryption key is added to the set of active past encryption keys based on the expiration timestamp associated with the current encryption key.

In another aspect, a set of credentials can be received, wherein the set of credentials include at least a username and an access zone identifier. The set of credentials can be verified. In response to verifying the set of credentials, a set of name-value pairs can be generated based on the set of credentials, a creation timestamp, and a set of encryption salt. A new token can be generated based on encrypting the set of name-value pairs using the current encryption key. The new token can be sent to a client associated with the set of credentials for use in future requests.

The following description and the drawings set forth certain illustrative aspects of the specification. These aspects are indicative, however, of but a few of the various ways in which the principles of the specification may be employed. Other advantages and novel features of the specification will become apparent from the detailed description of the specification when considered in conjunction with the drawings.

DETAILED DESCRIPTION

Figure 1:
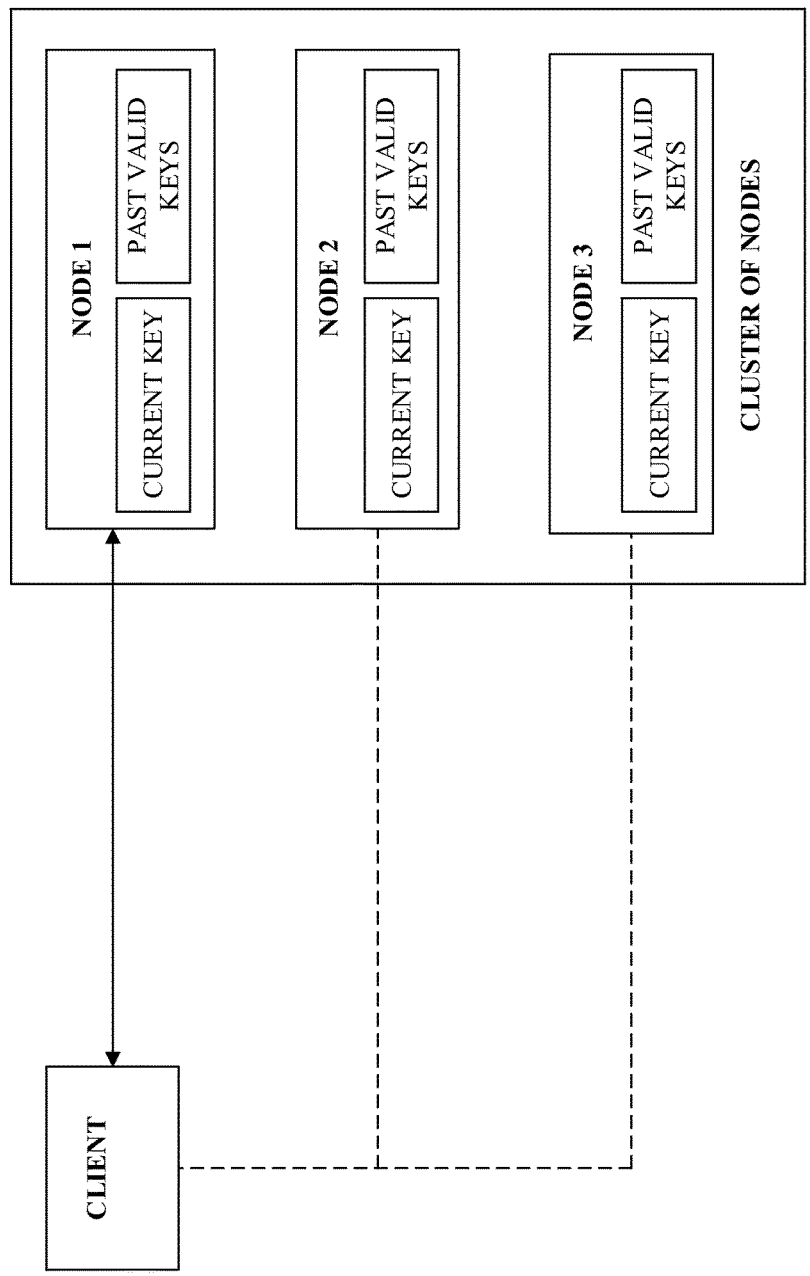
FIG. 1 illustrates an example cluster of nodes utilizing non-persistent shared authentication tokens in accordance with implementations of this disclosure.

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and devices are shown in block diagram form in order to facilitate describing the innovation.

The term "mode," as used herein refers to data structures that may store information, or meta-data, about files and folders, such as size, file ownership, access mode (read, write, execute permissions), time and date of creation and modification, file type, or the like. In at least one of the various embodiments, mode data structures may contain one or more references or pointer to the actual data blocks of the contents stored in the file. In at least one of the various embodiments, modes may be in a known location in a file system. From an mode, a reader or writer may access the contents of the mode and the contents of the file. Some file systems implement modes using a data structure called an mode. In at least one of the various embodiments, a data structure explicitly named "mode" may be absent, but file systems may have data structures that store data similar to modes and may provide capabilities similar to inodes as described herein. Also, in at least one of the various embodiments, the mode data may be referred to as stat data, in reference to the stat system call that provides the data to processes.

As used herein, the term "node" refers to a physical computing device, including, but not limited to, network devices, servers, processors, cloud architectures, or the like. A node may also include virtual machines, or the like. In at least one of the various embodiments, nodes may be arranged in a cluster interconnected by a high-bandwidth, low latency network backplane. In at least one of the various embodiments, non-resident clients may communicate to the nodes in a cluster through high-latency, relatively low-bandwidth front side network connections, such as Ethernet, or the like.

The term "cluster of nodes" refers to one or more nodes that operate together to form a distributed file system. In one example, a cluster of nodes forms a unified namespace for a distributed file system. Nodes within a cluster may communicate information about nodes within the cluster to other nodes in the cluster. Nodes among the cluster of nodes function using the same logical mode "LIN" mappings that describe the physical location of the data stored within the file system. Clients can connect to any one node among the cluster of nodes and access data stored within the cluster. For example, if a client is connected to a node, and that client requests data that is not stored locally within the node, the node can then load the requested data from other nodes of the cluster in order to fulfill the request of the client. Data protection plans can exist that stores copies or instances of file system data striped across multiple drives in a single node and/or multiple nodes among the cluster of nodes, thereby preventing failures of a node or a storage drive from disrupting access to data by the clients. Metadata, such as modes, for an entire distributed file system can be mirrored and/or synched across all nodes of the cluster of nodes.

The term "Access Zone" as used within this specification refers to a form of multi-tenancy that effectively partitions a single file system into trees that can act like distinct separate file systems to connected clients. Different access zones can have separate overlapping root directories, and can be affiliated with a distinct protocol. It can be appreciated that an admin access zone can be established for the root directory of the entire file system that can encompass all other access zones of the file system. Access zones can be associated with a set of unique IP addresses whereby clients connecting to the file system can be assigned an access zone based on the IP address of their connection. Access zones can be configurable to establish customizable authentication procedures, backup and recovery settings, data services, etc.

Implementations are provided herein for a token to be generated on one node within the cluster of nodes, and then used on any of the nodes to authenticate future client requests that include the token. The basis of the token can be a set of name value pairs that include discriminative information related to the client's user name, access zones, token timestamp, etc. An additional name-value pair or set of pairs can included encryption salt for additional security. The set of name value pairs can then be encrypted, in one implementation, using Advanced Encryption Standard ("AES") 256 bit key. Each node among the cluster of nodes can have access to the current encryption key. Thus, a single key, or in some implementations, past keys that are still valid, can be used to decrypt received tokens by any node among the cluster of nodes. Once decrypted, the name-value pairs of the decrypted token can be validated. The serialized name-value pairs in the token permit the system to quickly identify and authorize access to the cluster to the token holder. For example, it can be validated whether the access zone of the token matches the access zone the client is using to connect to the node. In another example, the username in the decrypted token can be validated against a set of known usernames. In another example, it can be determined whether the token is expired or has an improper creation date (e.g., a date in the future). Thus, it can be appreciated that a persistent store of all previously authenticated tokens does not need to be maintained. It can also be appreciated that the process of decrypting and validating the token against can decrease computational costs associated with extensive table lookups. For example, name-value pairs can be stored in memory in a node allowing for fast lookup and verification of decrypted name-value pairs generated from the received token.

In one implementation, when a client connects to a node, it either sends a token or it sends a set of credentials, that once validated, can be the basis for a newly generated token. For example, if the client sends credentials (e.g., because a token has not yet been issued to the client or because a previously sent token was invalid), the credentials can include a user name, password, passcode, biometric scan, pin number, etc. It can be appreciated that the implementations disclosed herein support any means of validating the credentials of the user. Based on the submitted credentials, and uniform to the file system, a set of name value pairs can be generated based of the authenticated credentials. For example, name value pairs can be associated with a user identifier, passcode identifier, token expiration timestamp, token creation timestamp, and access zone identifier.

Referring now to FIG. 1, there is illustrated an example cluster of nodes utilizing non-persistent shared authentication tokens in accordance with implementations of this disclosure. Each node among the cluster of nodes (e.g., Nodes 1, 2, and 3 as depicted) can store and synch with each other a common current encryption key. It can be appreciated that there is not there separate key stores as might be interpreted in looking at FIG. 1, rather a single key store is shared by all nodes of the cluster. For example, the shared key store could be a file within the distributed file system, with portions of the file stored on one or more than one node among the cluster of nodes. In one implementation, the key store can be synched and mirrored on each node of the cluster of nodes for efficient access by each node. In another implementation, the key can be stored in-memory or cache in each node or a subset of the nodes among the cluster of nodes.

For example, a client can connect to Node 1 and send a set of credentials. It can be appreciated that the client in FIG. 1 is separate from the cluster of nodes; however, a client could also be a user or automated process of the platform application program interface of the cluster of nodes (e.g., internal to the cluster of nodes and not an external client). Node 1 can then initiate the process to validate the credentials sent by the client. Once validated, Node 1 can use the validated credentials and a set of encryption salt to form a set of a name value pairs. The name value pairs can be encrypted using the current encryption key to generate a token. The token can then be sent back to the client for use in future requests. The client, in any future request to the file system, whether it be to Node 1, Node 2, or Node 3, can submit the token in the header of the request. The nodes among the cluster of nodes can then use the current encryption key to decrypt the token and determine if the decrypted token (e.g., the set of name-value pairs including the encryption salt) is valid. It can be appreciated the cost associated with synching an encryption key (and a set of past active encryption keys as detailed below) consumes less resources than synching and maintaining a list of valid tokens for hundreds or thousands of clients and/or processes between nodes of a cluster of nodes.

In one implementation, each token is associated with either an expiration time stamp and/or a creation time stamp that can act to establish an expiration time when the token is no longer valid. In one implementation, each token will expire 24 hours after it is issued. When a node decrypts a token that is determined from the name value pair associated with an expiration time stamp or a creation time stamps that indicates the token has expired, the node can send a message to the client that the token is invalid. In response, the client can send a set of credentials to the node, and once validated by the node, the node can issue a new token for continued access to the cluster by the client.

In one implementation, a manual and/or automated process is established for revoking and/or replacing the current encryption key. In an automated process implementation, the encryption key can be automatically revoked on a regular time interval. For example, each week, the current encryption key can be replaced, and each node among the cluster of nodes can update the current encryption key to match the newly issued key. In one implementation, the encryption key can be associated with an expiration timestamp that when reached, triggers an automatic replacement of the key by the cluster of nodes. In a manual process implementation, an administrator can trigger a new key being generated and synched across nodes among the cluster of nodes. For example, in response to security vulnerabilities, an administrator can trigger the file system to replace the current encryption key.

In one implementation, when the encryption key is replaced, a set of tokens generated using the previous encryption key may still be validated. For example, as discussed above, in one implementation a token is valid for 24 hours. If the token was generated one hour prior to the encryption key being replaced cluster wide, the token should still be valid for another 23 hours; however, if it is decrypted and validated against the newly issued encryption key, it would not be validated. Thus, implementations are provided herein for maintaining a set of still active past encryption keys. For example, when an encryption key is replaced due to an automated process, or a manual process, the expiration time stamp associated with the encryption key can be modified based on the token life span. For example, if tokens are valid for 24 hours, then upon an encryption key being replaced, the encryption key can moved to a store of valid past encryption keys and be associated with an expiration timestamp based on the time the key was replaced and the token lifespan. It can be appreciated that by maintaining the past encryption key through the lifespan of all tokens, then any token issued using the now replaced encryption key could still be validated during its life span. Like the current encryption key, past encryption keys can be maintained by each node and synched across the cluster of nodes.

In one implementation, multiple past encryption keys may still be used to validate tokens. Thus, if a token is received by a node and fails to be decrypted using the current encryption key, the token can be iteratively decrypted against the entire set of still active past encryption keys until decrypted by one of the active past encryption keys or until its failure to be decrypted. In the event the token is not decrypted, the node can proceed with re-authenticating the client according to the process for the network protocol. For example, an message can be sent to the client that the token was invalid, and the client can respond accordingly.

Figure 2:
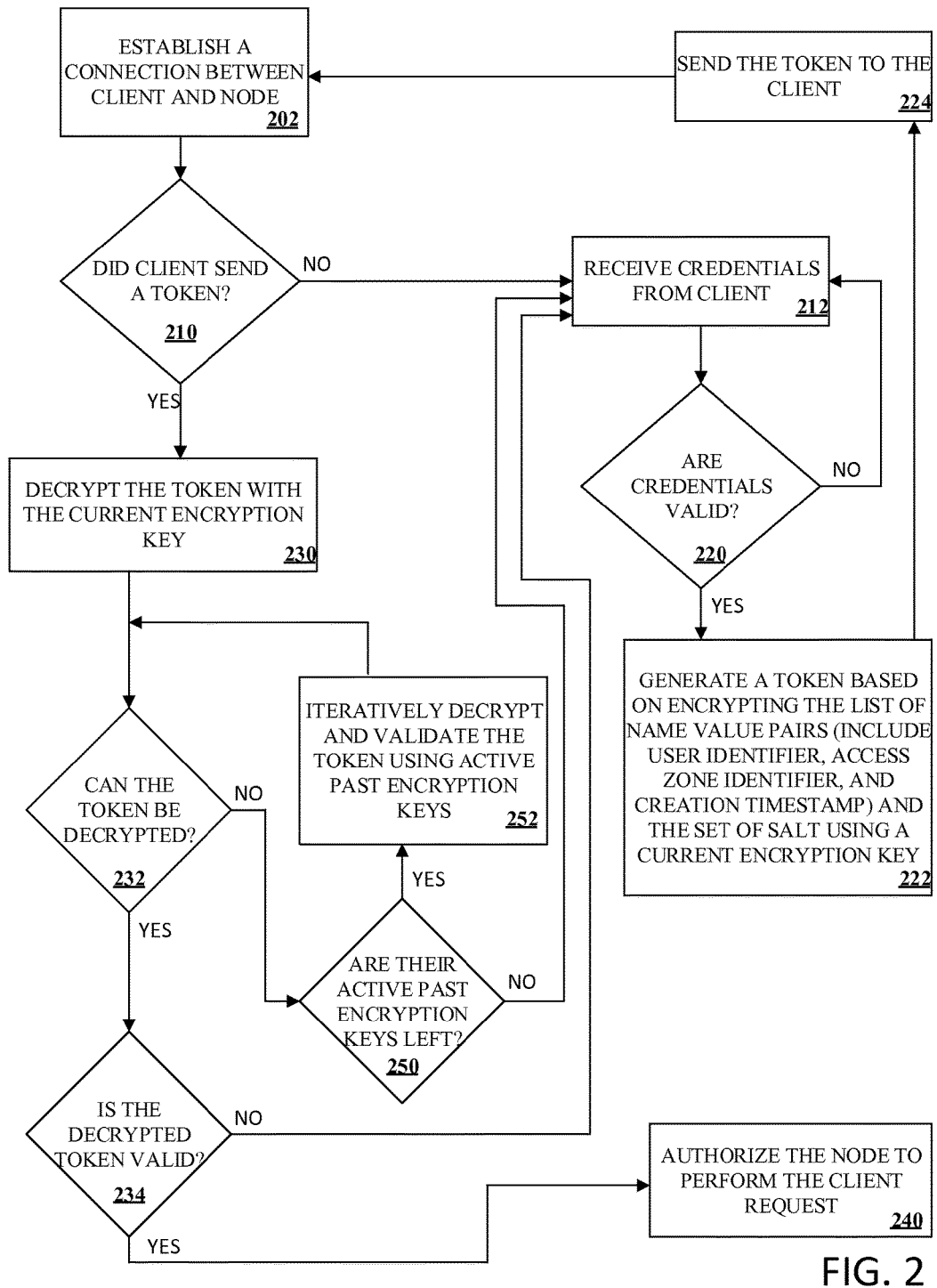
FIG. 2 illustrates an example method for generating and using non-persistent shared authentication tokens in accordance with implementations of this disclosure.

FIG. 2 illustrates a method and/or flow diagram in accordance with this disclosure. For simplicity of explanation, the method is depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Moreover, various acts have been described in detail above in connection with respective system diagrams. It is to be appreciated that the detailed description of such acts in the prior figures can be and are intended to be implementable in accordance with one or more of the following methods.

FIG. 2 illustrates an example method for generating and using non-persistent shared authentication tokens in accordance with implementations of this disclosure.

At 202, a connection can be established between the client and a node among a cluster of nodes. It can be appreciated that each node among the cluster of nodes has synched access to a current encryption key and a set of active past encryption keys. In one implementation, the keys can be stored in-memory within the node for efficient access.

At 210, it can be determined whether the client sent a token in establishing the connection with the node. If the client did not send a token, the method can proceed to step 212. If the client did send a token, the method can proceed to step 230.

At 212, credentials can be received from the client. For example, a user name, password, passkey, passcode image, biometric data such as a fingerprint, etc. can be used as credentials for a user. The credentials can be received form the client as a part of establishing the connection between the client and node at step 202 or in response to the client receiving notice that the token previously sent by the client was not valid. It can be appreciated that the node may not directly request credentials form the client, rather the node responds to either receipt of a token or a receipt of credentials with the appropriate validation process.

At 220, it can be determined whether the credentials received from the client are valid. For example, a data table that is synched across nodes of the cluster can contain authentication information related to clients of the distributed file system. In one implementation, the data table can be stored in memory for fast access. The synched data table can then be referenced to validate the received credentials. It can be appreciated that once a valid token is issued, the credentials should not need to be checked until the token is invalidated. If the received credentials are invalid, the method can proceed back to step 212 where new credentials can be received from the client in response to a node sending a protocol appropriate message that the previous credentials/token was invalid. In one implementation, after a threshold has been reached for failed authentications, a user identifier associated with the failed authentications can be temporarily denied access to the file system and an administrator can be notified that a user attempting to gain access to the file system has failed to be authenticated after a number of attempts at submitting their credentials.

At 222, a token can be generated based on encrypting the name value pairs (e.g., user identifier, access zone identifier, timestamp, encryption salt, etc.) using a current encryption key. It can be appreciated that the current encryption key is common to all nodes of the cluster.

At 224, the token can be sent to the client for use in future client requests made to any node among the cluster of nodes.

At 230, the token can be decrypted using the current encryption key. In one implementation, the encryption used is AES256. In other implementations, less secure hashing algorithms could be used, such as an HMac digest.

At 232, it can be determined if the token can be decrypted using the current encryption key. For example, a valid decrypted token will have name value pairs that make sense to the node, for example, a user identifier, zone identifier, the set of salt, and other discriminative information that allows the node to easily determine, without a separate table lookup, that the token has been decrypted using a valid key.

At 234, it can be determined if the decrypted token is valid. For example, name value pairs from the decrypted token can be checked for validity. Continuing the example, the access zone in the name-value pair of the decrypted token can be validated against the access zone the client is using to connect to the node. The username in the name-value pair of the decrypted token can be validated against a set of known usernames of the file system. The token can be assessed for whether it has expired using a creation time stamp or an expiration time stamp. A creation timestamp that is in the future can also cause a token to be invalidated.

If the decrypted token is validated, at 240, the node will be authorized to perform the client request associated with the token.

If the decrypted token is not validated, a protocol appropriate message can be sent to the client to alert them their token has failed validation, and the client can take appropriate action. For example, the client could send a set of credentials that can be received at 212.

At 250, if the token cannot be decrypted, it can be determined whether here are any active past encryption keys still left to decrypt the token against. For example, there can be many past encryption keys, but those that are still valid (e.g., are not associated with a creation timestamp or an expiration timestamp that invalidate the key) can be used to decrypt a token.

At 252, if there are active past encryption keys left, the method calls for iteratively decrypting the token using the active past encryption keys. It can be appreciated that steps 250, 252, and 232 can be repeated until all the active past encryption keys have been used to try and decrypt the token. If at 250 there are no longer any active past encryption keys left to decrypt against, a protocol appropriate message can be sent to the client to alert them their token has failed validation, and the client can take appropriate action. For example, the client could send a set of credentials that can be received at 212.

Figure 3:
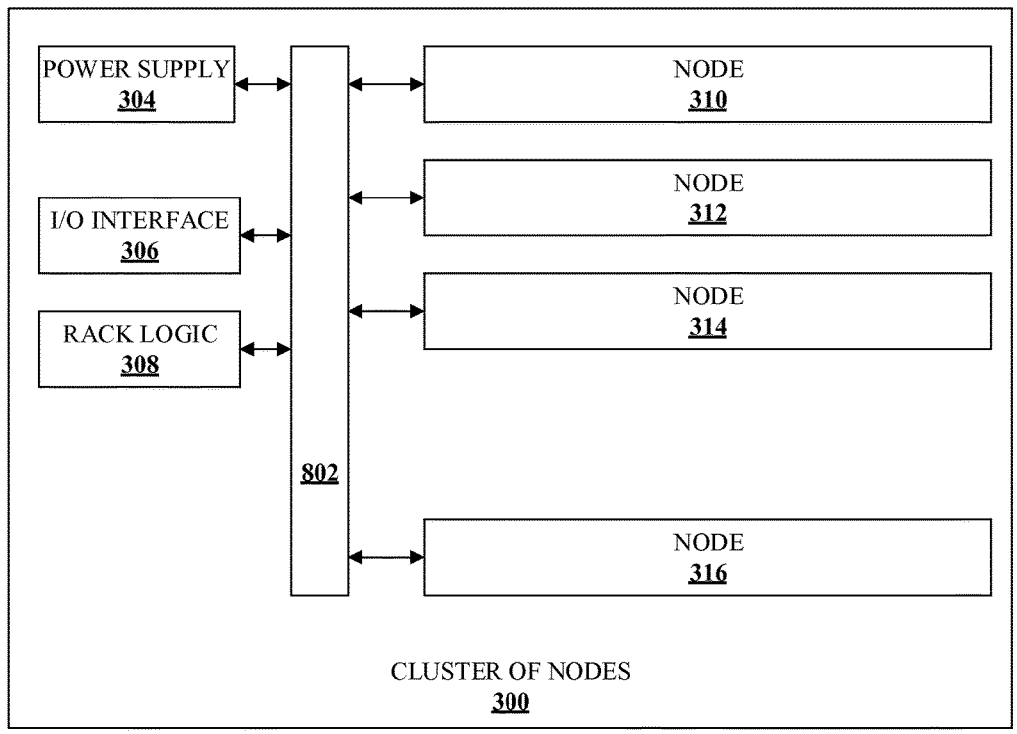
FIG. 3 illustrates an example block diagram of rack of a cluster of nodes in accordance with implementations of this disclosure.

FIG. 3 illustrates an example block diagram of a cluster of nodes in accordance with implementations of this disclosure. However, the components shown are sufficient to disclose an illustrative implementation. Generally, a node is a computing device with a modular design optimized to minimize the use of physical space and energy. A node can include processors, power blocks, cooling apparatus, network interfaces, input/output interfaces, etc. Although not shown, cluster of nodes typically includes several computers that merely require a network connection and a power cord connection to operate. Each node computer often includes redundant components for power and interfaces. The cluster of nodes 500 as depicted shows Nodes 310, 312, 314 and 316 operating in a cluster; however, it can be appreciated that more or less nodes can make up a cluster. It can be further appreciated that nodes among the cluster of nodes do not have to be in a same enclosure as shown for ease of explanation in FIG. 3, and can be geographically disparate. Backplane 302 can be any type of commercially available networking infrastructure that allows nodes among the cluster of nodes to communicate amongst each other in as close to real time as the networking infrastructure allows. It can be appreciated that the backplane 302 can also have a separate power supply, logic, I/O, etc. as necessary to support communication amongst nodes of the cluster of nodes.

As shown in the figure, enclosure 300 contains at least a power supply 304, an input/output interface 306, rack logic 308, several blade servers 310, 312, 314, and 316, and backplane 302. Power supply 304 provides power to each component and blade server within the enclosure. The input/output interface 306 provides internal and external communication for components and blade servers within the enclosure. Backplane 308 can enable passive and active communication of power, logic, input signals, and output signals for each blade server.

It can be appreciated that the Cluster of nodes 300 can be in communication with a second Cluster of Nodes as described in the subject disclosure and work in conjunction to provide at least the implementations as disclosed herein. Nodes can refer to a physical enclosure with a varying amount of CPU cores, random access memory, flash drive storage, magnetic drive storage, etc. For example, a single Node could contain, in one example, 36 disk drive bays with attached disk storage in each bay. It can be appreciated that nodes within the cluster of nodes can have varying configurations and need not be uniform.

Figure 4:
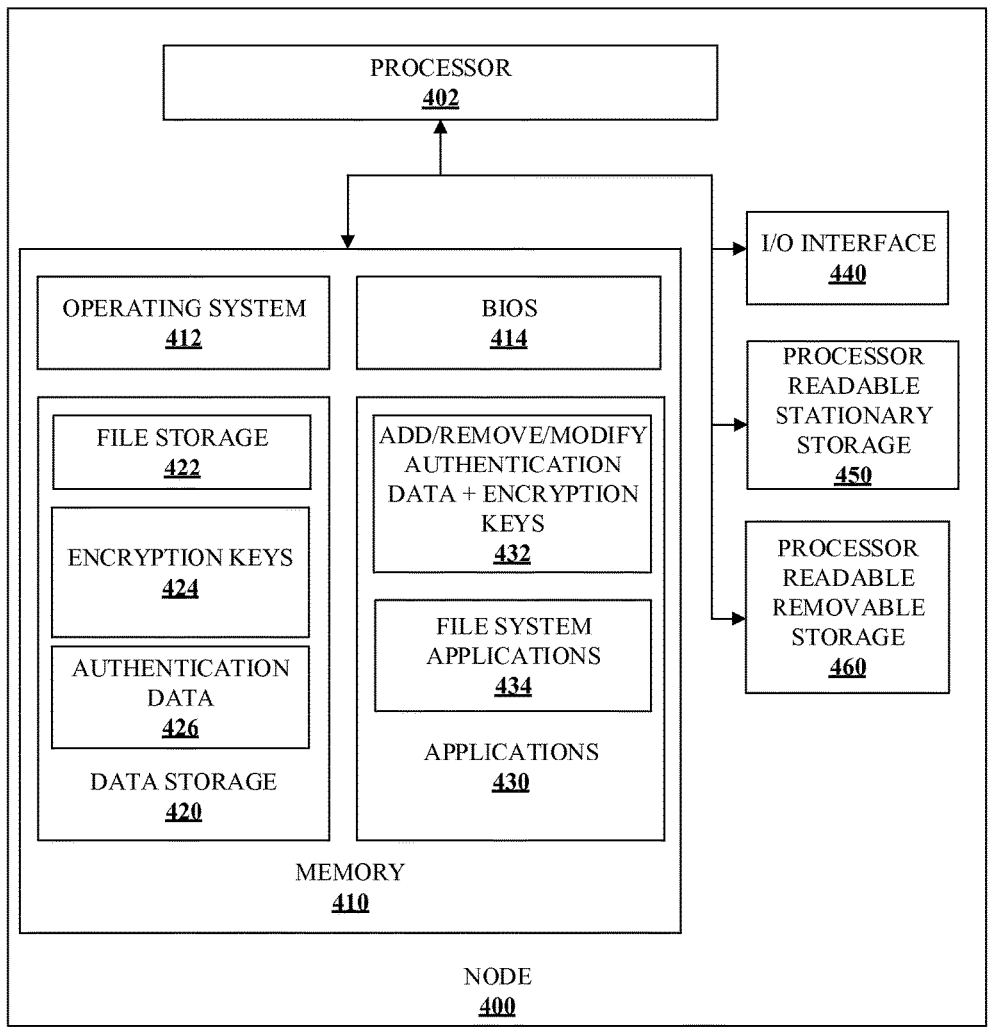
FIG. 4 illustrates an example block diagram of a node in accordance with implementations of this disclosure.

FIG. 4 illustrates an example block diagram of a blade server 400 in accordance with implementations of this disclosure. As shown in FIG. 3, a plurality of blade servers may be included in one enclosure that shares resources provided by the enclosure to reduce size, power, and cost.

Node 400 includes processor 402 which communicates with memory 410 via a bus. Node 400 also includes input/output interface 440, processor-readable stationary storage device(s) 450, and processor-readable removable storage device(s) 460. Input/output interface 440 can enable node 400 to communicate with other nodes, mobile devices, network devices, and the like. Processor-readable stationary storage device 450 may include one or more devices such as an electromagnetic storage device (hard disk), solid state hard disk (SSD), hybrid of both an SSD and a hard disk, and the like. In some configurations, a node may include many storage devices. Also, processor-readable removable storage device 460 enables processor 402 to read non-transitive storage media for storing and accessing processor-readable instructions, modules, data structures, and other forms of data. The non-transitive storage media may include Flash drives, tape media, floppy media, disc media, and the like.

Memory 410 may include Random Access Memory (RAM), Read-Only Memory (ROM), hybrid of RAM and ROM, and the like. As shown, memory 410 includes operating system 412 and basic input/output system (BIOS) 414 for enabling the operation of blade server 400. In various embodiments, a general-purpose operating system may be employed such as a version of UNIX, LINUX™, a specialized server operating system such as Microsoft's Windows Server™ and Apple Computer's OS X, or the like.

Applications 430 may include processor executable instructions which, when executed by node 400, transmit, receive, and/or otherwise process messages, audio, video, and enable communication with other networked computing devices. Examples of application programs include database servers, file servers, calendars, transcoders, and so forth. Applications 430 may include, for example, file system application 434, and add/remove/modify authentication data and encryption keys 432 according to implementations of this disclosure. For example, an application to issue a new encryption key can be used by a user or administrator to establish a new encryption key. It can be appreciated that a UI for such application can exists, such as within a web UI for the distributed file system as a whole.

Human interface components (not pictured), may be remotely associated with blade server 400, which can enable remote input to and/or output from blade server 400. For example, information to a display or from a keyboard can be routed through the input/output interface 440 to appropriate peripheral human interface components that are remotely located. Examples of peripheral human interface components include, but are not limited to, an audio interface, a display, keypad, pointing device, touch interface, and the like.

Data storage 420 may reside within memory 410 as well, storing file storage 422 data such as metadata or LIN data and encryption keys 424 as disclosed herein, and authentication data 426 that can be used authenticate clients connecting to a node or authenticate name-value pairs generated from a decrypted token. It can be appreciated that LIN data and/or metadata can relate to file storage within processor readable stationary storage 450 and/or processor readable removable storage 460. For example, LIN data may be cached in memory 410 for faster or more efficient frequent access versus being stored within processor readable stationary storage 450. In addition, Data storage 420 can also host zone data and token data in accordance with implementations of this disclosure.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

What has been described above includes examples of the implementations of the present disclosure. It is, of course, not possible to describe every conceivable combination of components or methods for purposes of describing the claimed subject matter, but many further combinations and permutations of the subject innovation are possible. Accordingly, the claimed subject matter is intended to embrace all such alterations, modifications, and variations that fall within the spirit and scope of the appended claims. Moreover, the above description of illustrated implementations of this disclosure, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

What is claimed is:

1. A method comprising:
   maintaining a current encryption key and a set of active past encryption keys within a cluster of nodes operating as a distributed file system wherein the current encryption key and active past encryption keys in the set of active past encryption keys are associated with an expiration timestamp and are accessible by any node among the cluster of nodes and wherein active past encryption keys in the set of active past encryption keys have not reached the expiration timestamp associated with each respective active past encryption key in the set of active past encryption keys;
   receiving a token by a node among the cluster of nodes wherein the token is associated with a request for the distributed file system;
   determining if the token can be decrypted with the current encryption key;
   in response to determining the token can be decrypted with the current encryption key, generating a decrypted token and determining if the decrypted token is valid based on a list of name value pairs within the decrypted token;
   in response to determining the decrypted token is invalid, sending a message to a client associated with the request that the token is invalid; and
   in response to determining the decrypted token is valid, authorizing the node to perform the request.

2. The method of claim 1, further comprising:
   in response determining the token cannot be decrypted with the current encryption key, iteratively decrypting the token using active past encryption keys in the set of active past encryption keys;
   in response to determining one of the active past encryption keys in the set of active past encryption keys can decrypt the token, generating the decrypted token and determining if the decrypted token is valid based on the list of name value pairs within the decrypted token; and
   in response to determining the iterative decryptions are invalid, sending a message to the client associated with the request that the token is invalid.

3. The method of claim 1, wherein the list of name value pairs include at least a username, an access zone identifier, a creation timestamp, and encryption salt.

4. The method of claim 1, wherein the decryption is based on AES256.

5. The method of claim 1, further comprising:
   receiving a command to replace the current encryption key based on at least one of the expiration timestamp or an administrator request; and
   generating a new encryption key based on at least one of the expiration timestamp or an administrator request wherein the new encryption key replaces the current encryption key and wherein the current encryption key is added to the set of active past encryption keys based on the expiration timestamp associated with the current encryption key.

6. The method of claim 1, further comprising:
   receiving a set of credentials wherein the set of credentials include at least a username and an access zone identifier;
   verifying the set of credentials;
   in response to verifying the set of credentials, generating a set of name-value pairs based on the set of credentials, a creation timestamp, and a set of encryption salt;
   generating a new token based on encrypting the set of name-value pairs using the current encryption key; and
   sending the new token to a client associated with the set of credentials for use in future requests.

7. The method of claim 6, wherein the new token is valid with any node among the cluster of nodes.

8. A computer readable medium with program instructions stored thereon to perform the following acts:
   maintaining a current encryption key and a set of active past encryption keys within a cluster of nodes operating as a distributed file system wherein the current encryption key and active past encryption keys in the set of active past encryption keys are associated with an expiration timestamp and are accessible by any node among the cluster of nodes and wherein active past encryption keys in the set of active past encryption keys have not reached the expiration timestamp associated with each respective active past encryption key in the set of active past encryption keys;
   receiving a token by a node among the cluster of nodes wherein the token is associated with a request for the distributed file system;
   determining if the token can be decrypted with the current encryption key;
   in response to determining the token can be decrypted with the current encryption key, generating a decrypted token and determining if the decrypted token is valid based on a list of name value pairs within the decrypted token;
   in response to determining the decrypted token is invalid, sending a message to a client associated with the request that the token is invalid; and
   in response to determining the decrypted token is valid, authorizing the node to perform the request.

9. The computer readable medium of claim 8, with program instructions stored thereon to further perform the following acts:
   in response determining the token cannot be decrypted with the current encryption key, iteratively decrypting the token using active past encryption keys in the set of active past encryption keys;
   in response to determining one of the active past encryption keys in the set of active past encryption keys can decrypt the token, generating the decrypted token and determining if the decrypted token is valid based on the list of name value pairs within the decrypted token; and
   in response to determining the iterative decryptions are invalid, sending a message to the client associated with the request that the token is invalid.

10. The computer readable medium of claim 8, wherein the list of name value pairs include at least a username, an access zone identifier, a creation timestamp, and encryption salt.

11. The computer readable medium of claim 8, wherein the decryption is based on AES256.

12. The computer readable medium of claim 8, with program instructions stored thereon to further perform the following acts:
   receiving a command to replace the current encryption key based on at least one of the expiration timestamp or an administrator request; and
   generating a new encryption key based on at least one of the expiration timestamp or an administrator request wherein the new encryption key replaces the current encryption key and wherein the current encryption key is added to the set of active past encryption keys based on the expiration timestamp associated with the current encryption key.

13. The computer readable medium of claim 8, with program instructions stored thereon to further perform the following acts:
- receiving a set of credentials wherein the set of credentials include at least a username and an access zone identifier;
- verifying the set of credentials;
- in response to verifying the set of credentials, generating a set of name-value pairs based on the set of credentials, a creation timestamp, and a set of encryption salt;
- generating a new token based on encrypting the set of name-value pairs using the current encryption key; and
- sending the new token to a client associated with the set of credentials for use in future requests.

14. The computer readable medium of claim 13, wherein the new token is valid with any node among the cluster of nodes.

15. A system comprising at least one storage device and at least one hardware processor configured to:
- maintain a current encryption key and a set of active past encryption keys within a cluster of nodes operating as a distributed file system wherein the current encryption key and active past encryption keys in the set of active past encryption keys are associated with an expiration timestamp and are accessible by any node among the cluster of nodes and wherein active past encryption keys in the set of active past encryption keys have not reached the expiration timestamp associated with each respective active past encryption key in the set of active past encryption keys;
- receive a token by a node among the cluster of nodes wherein the token is associated with a request for the distributed file system;
- determine if the token can be decrypted with the current encryption key;
- in response to determining the token can be decrypted with the current encryption key, generate a decrypted token and determine if the decrypted token is valid based on a list of name value pairs within the decrypted token;
- in response to determining the decrypted token is invalid, send a message to a client associated with the request that the token is invalid; and
- in response to determining the decrypted token is valid, authorize the node to perform the request.

16. The system of claim 15 further configured to:
- in response determining the token cannot be decrypted with the current encryption key, iteratively decrypt the token using active past encryption keys in the set of active past encryption keys;
- in response to determining one of the active past encryption keys in the set of active past encryption keys can decrypt the token, generate the decrypted token and determine if the decrypted token is valid based on the list of name value pairs within the decrypted token; and
- in response to determining the iterative decryptions are invalid, send a message to the client associated with the request that the token is invalid.

17. The system of claim 15, wherein the list of name value pairs include at least a username, an access zone identifier, a creation timestamp, and encryption salt.

18. The system of claim 15, wherein the decryption is based on AES256.

19. The system of claim 15, further configured to:
- receive a command to replace the current encryption key based on at least one of the expiration timestamp or an administrator request; and
- generate a new encryption key based on at least one of the expiration timestamp or an administrator request wherein the new encryption key replaces the current encryption key and wherein the current encryption key is added to the set of active past encryption keys based on the expiration timestamp associated with the current encryption key.

20. The system of claim 15 further configured to:
- receive a set of credentials wherein the set of credentials include at least a username and an access zone identifier;
- verify the set of credentials;
- in response to verifying the set of credentials, generating a set of name-value pairs based on the set of credentials, a creation timestamp, and a set of encryption salt;
- generate a new token based on encrypting the set of name-value pairs using the current encryption key; and
- send the new token to a client associated with the set of credentials for use in future requests.

21. The system of claim 20, wherein the new token is valid with any node among the cluster of nodes.

* * * * *